United States Patent [19]

Stowe

[11] Patent Number: 5,035,804
[45] Date of Patent: Jul. 30, 1991

[54] OIL SPILL WATER TREATMENT

[75] Inventor: Gene B. Stowe, Mesa, Ariz.

[73] Assignee: clnZall Corporation, Scottsdale, Ariz.

[21] Appl. No.: 583,294

[22] Filed: Sep. 17, 1990

[51] Int. Cl.$^5$ .............................................. B01D 15/00
[52] U.S. Cl. .................................. 210/671; 210/680;
210/693; 210/504; 210/506; 427/228; 428/403;
502/410; 502/411
[58] Field of Search ............... 210/671, 680, 693, 504,
210/506, 675; 428/403; 427/228; 502/410, 411,
418

[56] References Cited

U.S. PATENT DOCUMENTS

| | | | |
|---|---|---|---|
| 2,367,384 | 1/1945 | Tymstra et al. | 210/1 |
| 2,464,204 | 3/1949 | Baker | 210/16 |
| 2,565,107 | 8/1951 | Watts | 106/122 |
| 2,728,733 | 12/1955 | Hashimoto | 252/449 |
| 3,382,170 | 5/1968 | Pape | 210/36 |
| 3,414,511 | 12/1968 | Hitzman | 210/40 |
| 3,589,844 | 6/1971 | Kraemer | 431/8 |
| 3,607,741 | 9/1971 | Sohnius | 210/680 |
| 3,630,891 | 12/1971 | Peterson et al. | 210/680 |
| 3,696,051 | 10/1972 | McGuire | 252/425.5 |
| 3,855,152 | 12/1974 | Preus | 252/430 |
| 4,011,175 | 3/1977 | Preus | 252/427 |
| 4,302,325 | 11/1981 | Fletcher et al. | 208/180 |
| 4,360,420 | 11/1982 | Fletcher et al. | 208/184 |
| 4,399,025 | 8/1983 | Fletcher et al. | 208/180 |
| 4,775,457 | 10/1988 | Beer et al. | 208/13 |
| 4,787,323 | 11/1988 | Beer et al. | 110/346 |
| 4,834,889 | 5/1989 | Schleifforth | 210/708 |
| 4,959,154 | 9/1990 | Simmons | 210/680 |

OTHER PUBLICATIONS

Tarasevich et al., "Use of Perlitic Adsorbent for the Removal of Petroleum from Water", 1982 (Abstract).
Suoma et al., "Treatment of Water Containing Petroleum Hydrocarbons", 1979 (Abstract).
Pilipenko et al., "Production, Properties & Use of Hydrophobic Swollen Perlite in Water Treatment", 1981 (Abstract).
Akopyan et al., "Expanding Perlite", 1980 (Abstract).
Ekoperl, "Expanded Perlite Beads and/or Vermiculite Beads for Oil Absorption", 1980 (Abstract).
Bezorud'ko et al., "Use of Water proofed Perlite for the Removal of Petroleum from the Surface of Water", 1980 (Abstract).
Tarasevich et al., "Technology for the Production of a Swollen Perlite-Based Oleophilic Adsorbent for the Removal of Petroleum from Water", 1981 (Abstract).
Wienerberger Baustoffindustrie, "Material for Treating Water Covered with Oil or Mineral Oil Products", 1984 (Abstract).
Ekoperl, "Oil Adsorption Agent", 1981 (Abstract).
Yamamoto, "Adsorbent from Glassy Material", 1986 (Abstract).
Kato, "Lightweight Structural Material", 1975 (Abstract).
Yamakoshi, "Oil Adsorbent", 1974 (Abstract).
Funk et al., "Hydrophobic Absorbents for Petroleum", 1972 (Abstract).
Matushkin et al., "Water Repellent for an Expanded Perlite Sand Sorbent for Removing Petroleum & Petroleum Contaminants from the Water Surface", 1986 (Abstract).
Ono et al., "Removal of Oil from Waste Water", 1974 (Abstract).
Spivak et al., "Raw-Material Mixture for Producing Acid-Resistant Articles", 1980 (Abstract).
Molnar, "Insulating Material", 1985 (Abstract).
Akutsu et al., "Study on the Use of Recovered Sulfur", 1976 (Abstract).
Kiss et al., "Post-Hardening Construction Materials", 1984 (Abstract).
Saakyan et al., "Kinetics of Sintering of a Perlite-Alkali Mixture", 1975 (Abstract).
Saakyan, "Reaction Kinetics in the Sintering of Some Alkaline Compounds w/Silicate Materials", 1978 (Abstract).
Pashchenko et al., "Regeneration & Reuse of Spent Perlite-Based Hydrophobic Absorbent", 1984 (Abstract).
Allan, "Demulsifying Petroleum Emulsions", 1981 (Abstract).
Checterman, Charles W., 1975, "Perlite", Industrial Minerals & Rocks, American Institute of Mining, Metallurgical & Petroleum Engineers, vol. 1, pp. 927-934.
Strand, Philip R., 1975, "Vermiculite", Industrial Minerals & Rocks, Am. Institute of Mining, Metallurgical & Petroleum Engineers, Inc., pp. 1219-1226.
Sinha, R. K., 1984, "Perlite", Industrial Minerals, A. A. Balkena, Rotterdam, pp. 386-388.
Hess, L. Y., "Reprocessing & Disposal of Waste Petroleum Oils", Noyes Data Corp., 1979, pp. 15-16, 20-45, 67-69.

Primary Examiner—Stanley Silverman
Assistant Examiner—Cynthia L. Nessler
Attorney, Agent, or Firm—Cates & Holloway

[57] ABSTRACT

The invention relates to compositions and methods for removing oil from water surfaces. The composition comprises a fine grained particulate material, such as expanded perlite or vermiculite, or sand, coated with an oleophilic/hydrophobic layer comprising sulfur, a metallic sulfate, an alkali metal nitrate, and burned hydrocarbon oil. The invention is particularly applicable to the treatment of oil spills on the surfaces of open bodies of water, such as lakes, rivers and oceans. The invention also relates to methods for preparing the oil removal composition, and for stripping and recycling the compositions after use.

35 Claims, No Drawings

OIL SPILL WATER TREATMENT

FIELD OF THE INVENTION

This invention relates to methods and compositions for removing oil from water surfaces. The invention is particularly applicable to the treatment of oil spills on the surfaces of open bodies of water such as lakes, rivers and oceans. The invention also relates to methods for preparing the oil removal compositions, and for stripping and recycling the compositions after use.

BACKGROUND AND PRIOR ART

The presence of petroleum oil on the surface of bodies of water is not new to the Earth's environment. For thousands of years, oil has seeped into rivers, lakes and oceans all over the world. Only in the last fifty years or so has the appearance of oil slicks on waterways been a cause for alarm.

Oil slicks on the surface of open bodies of water may result from accidental spills when a ship is being fueled; when a tanker is being loaded or unloaded; or when a tanker is wrecked and breaks up on the high seas. In some instances, oil appears on the surface of the water in rivers or ports when oil-carrying storage tanks are flushed with water. Oil slicks may also occur when leaks, fires or explosions are encountered during offshore drilling operations.

When an oil spill occurs, the oil is carried by tides, currents and winds to adjacent shore lines where it fouls beaches, kills marine animal life and plant life and adversely affects boating, bathing, fishing, or drinking water. When oil slicks develop around loading docks, ship yards, offshore drilling platforms, barges and piers, the fire potential is very serious, and in the event a slick should be ignited, the resulting fire may cause loss of life as well as property and materials. The major oil spills of recent years, wherein millions of gallons of oil have been abruptly dumped into the ocean, have magnified the need for rapid and effective means of containment.

Once an oil spill occurs, pollution damage begins immediately and is magnified many times as the oil disperses, and especially as it is washed ashore. Of the millions of dollars which are spent on the clean up of oil spills, the major part is devoted to cosmetic purposes, cleaning up the oil after the major damage has been done on shore. Dramatic savings ar available if the oil can be contained and the damage arrested at the scene of the spill.

Over the years, numerous containment methods and compositions have been tested for the removal of oil from the surface of water. In some of the prior art, absorbent materials such as sawdust, peat fibers, diatomaceous earth, expanded perlite or vermiculite, and the like, have been used to spread upon the oil slick in order to soak up the oil. For example, in U.S. Pat. No. 3,414,511, exfoliated vermiculite is floated on oil polluted water to absorb oil, which is then removed from the water by skimming the vermiculite. Similarly, in the Sinha article on "Perlite", *Industrial Minerals* (A. A. Balkema, Rotterdam, pp. 386-388) the author refers to the practice of port authorities to keep stocks of expanded perlite available to cope with the eventualities of oil spillage.

In other prior art, absorbents such as the above are used in combination with other reagents to clean up oil spills. For example, in U.S. Pat. No. 3,855,152 and U.S. Pat. No. 4,011,175, expanded perlite is mixed with asphalt, cellulose fibers and clay, and the resulting mixture is spread on oil spills to absorb the oil and remain floating, for subsequent collection. Along the same lines, U.S. Pat. No. 2,728,733 shows a procedure in which perlite fines are mixed with bentonite clay and fired to produce a light-weight aggregate which is scattered on the floor of machine shops to absorb water and oil.

A difficulty with materials which are mere absorbents is that they are absorbents for both water and oil, so that a large part of the absorptive capacity of the particles is consumed by saturation by water and is unavailable for pick-up of the oil. Therefore, in other prior art, efforts have been made to coat or otherwise modify the absorbents to enhance their selectivity for oil over water. Thus, for example, in U.S. Pat. No. 3,382,170, expanded perlite is coated with silicone to render it hydrophobic, and it is then used for selectively removing oil from water. In Japanese patent No. 74 45,467, perlite granules are coated with polypropylene to produce oleophilic-hydrophobic granules for the treatment of oil spills. In U.S. Pat. No. 3,696,051, vermiculite is coated with a metallic cyclopentadienyl compound and then spread on oil slicks for use as a wicking agent in enhancing the burning of the oil from the slicks. In U.S. Pat. No. 2,464,204, a mineral aggregate such as sand is mixed with petroleum asphalt and fuel oil and heated to 700 degrees F. to provide aggregate particles having a coating of solid carbon, which is then used for the treatment of oil slicks.

In view of the enormous size of the oil spills which have occurred in recent history, a need has developed for scavenging compositions which are not only selective for the petroleum oils but which have enhanced capacity for adsorbing the oil in the huge spills, as well as improved power to "lock" onto and retain the oil through the turbulent, abrasive mechanical handling conditions involved in the recovery procedure. Also, in view of the emergency nature of combating the major oil spills, there is a need for compositions which may be manufactured in readily available commercial production equipment which can be brought on-site for producing a steady flow of material for stockpile replenishment.

It is an object of the present invention to provide compositions and methods satisfying the foregoing needs.

It is another object of the invention to provide oil recovery compositions which have a durable oleophilic/hydrophobic coating which is retained through abrasive handling and stockpiling conditions and which has a substantially enhanced capacity for the adsorption of oil.

It is a further object of the invention to provide oil recovery compositions which react instantaneously with the oil and securely bind the recovered oil during the vigorous agitation that is involved in the recovery procedure.

It is still another object to provide compositions which can be manufactured in readily available equipment and which require no specialized ships or barges for dispensing at the oil spill site.

It is yet another object to provide oil recovery compositions which ca be stripped of recovered oil and recycled for the recovery of additional oil.

It is a further object to provide methods for the production and recycling of the oil recovery compositions, as well as methods for treating the oil slicks themselves.

Other object and advantages will become apparent as the specification proceeds.

SUMMARY OF THE INVENTION

This invention relates to a new and improved composition for removing oil from the surface of water, comprising a fine-grained aggregate or particulate material having a unique coating comprising sulfur, a metallic sulfate, an alkali metal nitrate and burned hydrocarbon oil. By applying the special coating to an aggregate having a specific gravity less than 1, the oil removal composition can be made in a buoyant form; or, if preferred, by choice of an aggregate having a specific gravity greater than 1, the composition can be made in a form which settles to the bottom of a body of water after adsorbing the oil.

A preferred embodiment of the buoyant form of the invention comprises a mineral aggregate such as expanded perlite or vermiculite, in which each of the particles is coated with a combination of sulfur, ferrous sulfate, sodium nitrate, and burned hydrocarbon oil. A preferred embodiment of the heavier form of the invention comprises a mineral aggregate such as sand or gravel, in which each of the particles is coated with the same combination.

The oil removal composition as described above has been found to have an extremely hard, durable coating which effectively resists abrasion during storage and handling, and which also possesses enhanced oleophilic/hydrophobic properties enabling the composition to selectively and rapidly adsorb oil from oil spills and to hold the oil securely through the turbulent, abrasive mechanical handling conditions involved in the recovery procedure.

The invention also relates to a method for producing the improved oil recovery composition, such method comprising the steps of providing a particulate material, forming a coating on said material comprising sulfur, a metallic sulfate, an alkali metal nitrate, and a hydrocarbon oil, and igniting the coating material to produce a carbonized coating which is permanently bonded to the particulate material. In a preferred embodiment of the method invention, the particulate material is heated and then mixed with sulfur, ferrous sulfate and sodium nitrate to form a melted base coating on the material, the coated material is mixed with hydrocarbon oil, and the product is then ignited to produce a permanently bonded carbonized coating on the material.

The invention also contemplates a method for removing oil from the surface of water comprising the steps of providing one of the compositions described above and applying the composition to the oil on the water surface. One of the preferred embodiments of the method invention comprises supplying one of the buoyant compositions described above, applying it to the oil on the water surface, removing the composition, with the oil adsorbed thereon, from the surface of the water, and then stripping the adsorbed oil from the composition, thereby rendering the composition available for further use in removing oil from the surface of water.

DETAILED DESCRIPTION OF THE INVENTION

In preparing the oil recovery composition of the present invention, the procedure is initiated by selecting a fine-grained particulate material which is to be coated to render it oleophilic/hydrophobic. If it is desired to produce an end product which is buoyant, the particulate material should preferably be a noncombustible inorganic material having a specific gravity less than 1. Examples of such materials include expanded perlite, expanded vermiculite, pumicite, scoria, haydite, cellular glass nodules, and other similar aggregates of porous character.

The characteristics of mineral particulate materials such as vermiculite and perlite, in their exfoliated or expanded form, make them especially useful as base materials in the present invention. These materials are readily available on a commercial basis at reasonable cost. They are obtained by subjecting the raw material in a suitable furnace to an expanding temperature in excess of 1000 degrees F. The most frequently used procedure involves allowing granules of vermiculite or perlite to descend through an expansion zone of a furnace at a temperature within the range of about 1500 degrees F. to about 2100 degrees F. Expanded vermiculite and perlite thus obtained have a bulk density of about 4 to 10 pounds per cubic foot and are normally used in the present invention when screened to size ⅛" minus.

If it is desired to produce a heavier end product which will settle to the bottom of the water, the particulate material may be a fine-grained aggregate having a specific gravity greater than 1. Materials such as sand, gravel, silica, and the like, are suitable for this purpose, normally screened 10 mesh minus 60 mesh plus.

In the practice of the invention, the selected particulate material is coated with a specialized mixture of reagents which are effective to produce an oleophilic, hydrophobic layer on each of the individual particles. The mixture includes sulfur, a metallic sulfate, an alkali metal nitrate, and a hydrocarbon oil.

The preferred metallic sulfate is ferrous sulfate, although other analogous compounds, such as cobaltous sulfate and nickel sulfate are also usable. The nitrate may be either sodium or potassium nitrate. The hydrocarbon oil may be obtained from any source, although waste motor oil is preferred because of the economical advantages it affords.

In applying the coating to the particulate material, it is preferred first to heat a quantity of the particulate material in a suitable vessel to a temperature exceeding 400 degrees F., and then mechanically add a dry mixture of the sulfur, sulfate and nitrate. As the contents of the vessel are agitated, the dry mixture melts to provide an even coating, having a thickness of approximately 5 mils, on the particles of the heated aggregate. When the coating has become uniform, the hydrocarbon oil is added to the mix and ignited. Baking of the special coating takes place, due in part to the exothermic action of chemical change in combustion when the hydrocarbon oil ignites the dry mixture. This burning, at about 1000 degrees F., causes the organic and inorganic materials to permanently bond to the softened aggregate. As an alternate method, all four additives (i.e., the sulfur, the sulfate, the nitrate, and the hydrocarbon oil) may be added together to the heated aggregate to form the special coating, and the coated product is then ignited and burned, as above, to cause the organic and inorganic materials to be permanently bonded to the aggregate.

In either case, the resulting microporous special coating, when cooled, exhibits strong capillary attraction to all hydrocarbons, while repulsing the water on which the oil is floating. The coating is glass-like and is hard and durable.

The proportions of reagents in the coating mixture may vary within certain practical limits. Generally, the sulfur concentration in the mixture should be in the range of 40 to 60 percent by weight; the sulfate in the range of 5 to 15 percent by weight; the nitrate in the range of 15 to 25 percent by weight; and the hydrocarbon oil in the range from about 10 to 20 percent by weight. A preferred coating mixture is one in which the concentration of sulfur is about 53% per cent; the sulfate 9 percent; the nitrate 22 percent; and the hydrocarbon oil about 16 percent. The coating mixture itself is ordinarily used in a concentration of about 5 to 15 percent by weight of the weight of the aggregate to which it is applied, depending to some extent on the specific gravity of the aggregate. A preferred concentration for the coating mixture when the aggregate is expanded perlite or vermiculite is approximately 11 percent by weight.

It is a feature of the invention that the mixing of the aggregate and the coating reagents may be carried out in conventional mixing equipment that is readily available in localities throughout the world. For example, an asphalt mixing plant, such as used to produce hot asphalt road mix, can be used with very slight modification. Such type of plant has excellent scrubbing facilities for exhaust fumes and can be sized to produce up to 300 tons per hour. By using local facilities adjacent the spill site, an oil spill can be contained rapidly and inexpensively. Once produced, the coated aggregate can be carried to the spill site in tote bags which hold as much as three cubic yards. Helicopters and airplanes may be used, in the same manner as in fighting forest fires.

Upon production of the coated oil removal composition, it may be used immediately in the removal of unwanted oil, or it may stockpiled for future use. The material has a hard and durable carbonized coating of measurable thickness, which will not flake off during storage. The aggregate is fine-grained to obtain the maximum amount of coating. It is insoluble in water or oil; the particles are non-adhering; and, being non-hygroscopic, they do not tend to pick up water from the atmosphere. With these characteristics, the composition is very stable in storage and may be stockpiled indefinitely.

When an oil spill occurs, the composition of the present invention may be applied to the oil on the surface of the water, using any suitable mechanical means to bring the material into contact with the oil. For example, normal sea-going deck barges may be equipped with hoppers and arm-type dispensers with elongated variable openings which will drop a sheet of the coated particulate material on the oil slick at the desired location. The flow rate of the material onto the oil slick may be adjusted to meet changing conditions of oil thickness, boat speed, etc. Other suitable means of application, such as sand blast equipment or other blower type dispensers, may also be used.

When applied, the composition immediately adsorbs or "locks" onto the floating oil. The adsorption reaction is instantaneous and, in the case of the buoyant aggregate, occurs at a ratio of about one pound of oil per pound of aggregate. Any surplus oil, over and above the capacity of the aggregate, will normally re-surface promptly, where it can be attacked again with additional quantities of fresh aggregate. It is a feature of the invention that the coated aggregate securely holds the recovered oil and does not release it, even though subjected to vigorous agitation and severe abrasion during subsequent collection procedures. The oil is locked onto the coated aggregate until it is intentionally stripped therefrom by purposeful extraction methods, or by bacteria that can metabolize the oil, such as Beggiatoa Bacteria, which thrive on oil with or without oxygen.

In the event the non-buoyant form of the present invention is used, the oil-saturated heavy aggregate will immediately sink to the bottom of the body of water, where it can subsequently be removed by dredging, if desired. If recovery in this manner is not possible, the oil-saturated aggregate can remain at the bottom without harm to marine life, since the bound oil is rendered innocuous. Eventually, bacterial action will cause digestion of the oil over a period of time, and the residual material will be merely a layer of sand or gravel at the bottom. The use of aggregates heavier than water is particularly applicable to the treatment of oil slicks which may be found around loading docks, ship yards, offshore drilling platforms, barges, and piers. The hydrocarbons found in these slicks are usually oily substances or other organic liquids, such as fuel oils, gasoline, jet fuel, paint thinners, and many other substance that are immiscible with and lighter than water, and are highly combustible. If surface collection is not possible, use of the present invention to submerge the hydrocarbons is preferable to allowing them to remain on the surface as a fire hazard.

In the event the buoyant form of the present invention is used, the oil-saturated aggregate may be collected at the site by conventional means such as skimmers, rotating drums, endless belts, scoops, sieves, nets, and the like. However, even if immediate collection is not possible, it is significant that oil which is adsorbed to the aggregate in this manner is rendered innocuous and, even though carried by tides and currents to adjacent beaches, does not foul the beach as untreated oil does. The bound form of the oil is not allowed to bleed off, and it does not cause damage to wildlife, city water systems, commercial interest, recreational areas or estuarial ecology. Birds and animals may swim through the saturated material with no transfer of oil to fur or feathers. The bound oil will not transfer to the sand or rocks, and, when washed high upon the sand, can be removed by a high vacuum truck without removing the sand.

When the oil-laden aggregate has been collected, whether by skimming at the site of the spill, or by use of a vacuum truck on the shore, or by dredging, it is ready to be transported to an oil reclaiming location, usually on shore. At this point, the preferred procedure is to use a combination of solvent extraction and detergent cleaning to remove the oil and prepare the coated particulate material for recycling into the recovery of oil from the surface of water.

In the reclaiming procedure, the oil-laden aggregate is subjected to solvent agitation to strip the oil from the coated aggregate. Any suitable hydrocarbon solvent is effective for this purpose. A preferred solvent is sold under the trademark WPE-94 by International Resource Recovery Ltd., Mesa, Ariz. The proportions of solvent to aggregate will vary, depending upon the nature of both materials, but generally a 1:1 ratio (by weight) of the two materials will be suitable. After the solvent extraction step, the solvent/oil mixture is distilled to volatilize off the solvent for reuse in the circuit, while the residual crude oil may be stored or sent to a refinery. The coated aggregate of the present invention, which remains after the solvent extraction, is treated with a detergent to remove residual solvent, and is then rinsed in water and dried (e.g. by centrifuging or screening) down to a moisture content below 15%, in which form it may be recycled to reclaim more oil from the surface of bodies of water, as described above.

Under other circumstances, where solvent extraction is not available, the petroleum-laden aggregate can be treated by burning off the captured petroleum. Such treatment does not adversely affect the adsorbent properties of the coated aggregate if the temperature does not exceed 1500 degrees F.

The oil recovery composition of the present invention provides numerous advantages which enable development of a needed standardized system for combating oil spills. The product itself is economical, non-toxic, non-flammable, easy to apply and requires no protective clothing during its application. It reacts with the oil and totally immobilizes it instantaneously. It requires only standardized manufacturing equipment, and only the customary application equipment such as barges, arm-type dispensers, booms, skimmers, and the like. It is readily adaptable to the many kinds of oil pollution that are encountered, and has the advantage that it can be recycled and reused indefinitely.

A feature of the invention is that it lays the basis for the development of standardized task force operations for combating oil spills, much along the lines of the standardized fire fighting operations which have been in place for a long period of time. The invention contemplates standardized systems in which all areas, where oil is loaded, unloaded, transported or produced, will have ships or barges on stand-by, 24 hours per day, loaded with the products of the present invention, together with the necessary dispensing equipment, and manned by professionals trained in the systems of the invention.

The following examples describe specific embodiments which are illustrative of the invention:

EXAMPLE 1

One ton of expanded perlite is introduced into an asphalt mixing plant and heated to a temperature of 425 degrees F. while agitating. Following this, 120 pounds of powdered sulfur, 50 pounds of sodium nitrate and 20 pounds of ferrous sulfate are mixed together and added to the heated perlite while continuing the agitation. When the particles of perlite have been evenly coated with the added chemicals, 5 gallons of waste motor oil are added, and the mixture is ignited. During burning of the mixture, the agitation is continued, so that the gases of combustion are evolved and trapped in the scrubber attached to the mixing plant. The burning mixture is allowed to burn itself out and then cooled to ambient temperature, screened to remove the minus 100 mesh fraction, and then placed in storage.

The treated product has a permanent, glassy coating which is non-hygroscopic and does not rub off or flake off during storage. The fine-grained product is buoyant (with a specific gravity less than 1) and is insoluble in water and hydrocarbons. When the product is spread on top of a floating crude oil slick, it immediately selectively adsorbs the crude oil, producing a floating oil-laden aggregate in which the oil is permanently bonded and immobilized.

EXAMPLE 2

The procedure of Example 1 is repeated, using expanded vermiculite as the aggregate. A product similar in all respects to the product of Example 1 is produced.

EXAMPLE 3

One ton of sand (natural, screened 10 mesh minus 60 mesh plus) is introduced into an asphalt mixing plant and heated to a temperature of 425 degrees F. while agitating. Following this, 120 pounds of powdered sulfur, 50 pounds of sodium nitrate and 20 pounds of ferrous sulfate are mixed together and added to the heated sand while continuing the agitation. When the particles of sand have been evenly coated with the added chemicals, 5 gallons of waste motor oil are added, and the mixture is ignited. During burning of the mixture, the agitation is continued, so that the gases of combustion are evolved and trapped in the scrubber attached to the mixing plant. The burning mixture is allowed to burn itself out and then cooled to ambient temperature, screened to remove the minus 100 mesh fraction, and then placed in storage.

The treated product has a permanent, glassy coating which is non-hygroscopic and does not rub off or flake off during storage. The fine-grained product is heavier than water (with a specific gravity greater than 1) and is insoluble in water and hydrocarbons. When the product is spread on top of a floating crude oil slick it immediately selectively adsorbs the crude oil, producing an oil-laden aggregate which permanently bonds and immobilizes the oil, and which sinks to the bottom of the water.

EXAMPLE 4

One ton of pumicite is introduced into an asphalt mixing plant and heated to a temperature of 425 degrees F. while agitating. Following this, 120 pounds of powdered sulfur, 50 pounds of sodium nitrate, 20 pounds of ferrous sulfate and 5 gallons of waste motor oil are mixed together and added to the heated pumicite while continuing the agitation. When the particles of pumicite have been evenly coated with the added chemicals, the mixture is ignited. During burning of the mixture, the agitation is continued, so that the gases of combustion are evolved and trapped in the scrubber attached to the mixing plant. The burning mixture is allowed to burn itself out and then cooled to ambient temperature, screened to remove the minus 100 mesh fraction, and then placed in storage.

The treated product has a permanent, glassy coating which is non-hygroscopic and does not rub off or flake off during storage. The fine-grained product is buoyant (with a specific gravity less than 1) and is insoluble in water and hydrocarbons. When the product is spread on top of a floating crude oil slick, it immediately selectively adsorbs the crude oil, producing a floating oil-laden aggregate in which the oil is permanently bonded and immobilized.

EXAMPLE 5

The oil-laden floating aggregate obtained in Example 1 is treated to remove the oil and reclaim the coated perlite for further use, as follows:

300 gallons of WPE-94 solvent are charged to a solvent extraction tank, one ton of oil-laden aggregate is added, and the mixture is agitated to separate the oil from the aggregate and dissolve it in the solvent. Following this, the oil-laden solvent is decanted and piped to a distillation unit operating at approximately 600 degrees F., where the solvent volatilizes off for reuse in the circuit. The crude oil is removed from the unit and transported to a refinery. The coated perlite, from which the oil has been stripped, is transferred to a wash vessel where it is agitated with WPE-74 surfactant (obtained from International Resource Recovery Ltd., Mesa, Ariz.), rinsed with water, and then centrifuged to bring the moisture content below 15%. The dried coated aggregate is then sent to stockpile, ready for reuse in the separation of oil from water.

The WPE-94 solvent used in the above procedure was a mixture of naphtha, mineral oil, tetrahydrofuran, oxolane and epoxybutane having the following specifications:

| Boiling point | 200 degrees F. |
|---|---|
| Flash point | 20 degrees F. |
| Evaporation rate | 2.8 |
| Specific gravity | 0.8034 |
| Pounds per gallon | 6.692 |
| Vapor density | 3.6 |
| Appearance | Clear and colorless |
| Odor | Citric and ethereal |

The WPE-74 surfactant used in the above procedure was a water-soluble mixture of surfactants, detergents and penetrants having the following specifications:

| Boiling point | 176 degrees F. |
|---|---|
| Solubility in water | 100% |
| Appearance | Clear to amber |
| Odor | Pungent |
| Specific gravity | 1.17 |
| Pounds per gallon | 9.75 |

Although various preferred embodiments of the invention have been described in detail it will be understood that variations may be made without departing from the spirit of the invention. Although the invention has been described primarily in terms of recovering oil from oil spills, it will be understood that it can also be used in industrial filters to service industries which have hydrocarbon effluent problems as a result of the use of oils, greases, fats and the like as carrying agents.

What is claimed is:

1. A composition for removing oil from the surface of water, comprising a particulate material having an oleophilic, hydrophobic carbonized coating, said coating comprising sulfur, a metallic sulfate, an alkali metal nitrate, and burned hydrocarbon oil.

2. The composition of claim 1 wherein the particulate material is a mineral aggregate selected from the group consisting of vermiculite, perlite, pumicite, sand, gravel, and silica.

3. The composition of claim 1 wherein the particulate material has a specific gravity of less than 1.

4. The composition of claim 1 wherein the particulate material has a specific gravity of more than 1.

5. The composition of claim 1 wherein the metallic sulfate is ferrous sulfate.

6. The composition of claim 1 wherein the alkali metal nitrate is sodium nitrate.

7. A composition for removing oil from the surface of water, comprising a particulate material having an oleophilic, hydrophobic coating comprising a base layer of a mixture of sulfur, a metallic sulfate, and an alkali metal nitrate, and an outer carbonized layer.

8. The composition of claim 7 wherein the outer carbonized layer is burned hydrocarbon oil.

9. A composition for removing oil from the surface of water comprising expanded vermiculite having an oleophilic, hydrophobic carbonized coating, said coating comprising a mixture of sulfur, ferrous sulfate, sodium nitrate, and burned hydrocarbon oil.

10. A method for preparing a composition for removing oil from the surface of water comprising the steps of providing a particulate material, forming a coating on said material comprising sulfur, a metallic sulfate, an alkali metal nitrate, and a hydrocarbon oil, and igniting the mixture to produce a carbonized coating which is permanently bonded to said particulate material.

11. The method of claim 10 wherein the particulate material is a mineral aggregate selected from the group consisting of vermiculite, perlite, pumicite, sand, gravel, and silica.

12. The method of claim 10 wherein the particulate material has a specific gravity of less than 1.

13. The method of claim 10 wherein the particulate material has a specific gravity of more than 1.

14. The method of claim 10 wherein the metallic sulfate is ferrous sulfate.

15. The method of claim 10 wherein the alkali metal nitrate is sodium nitrate.

16. The method of claim 10 wherein the outer carbonized layer is burned hydrocarbon oil.

17. A method for preparing a composition for removing oil from the surface of water comprising the steps of heating expanded vermiculite, mixing said heated vermiculite with sulfur, ferrous sulfate and sodium nitrate to form a melted base coating on said vermiculite, mixing said coated vermiculite with hydrocarbon oil, and igniting the mixture to produce a carbonized coating which is permanently bonded to said expanded vermiculite.

18. A method for removing oil from the surface of water comprising the steps of:
   a. providing a particulate material having an oleophilic, hydrophobic carbonized coating comprising a mixture of sulfur, a metallic sulfate, and an alkali metal nitrate, and burned hydrocarbon oil; and
   b. applying said coated particulate material to the oil on said water surface to cause adsorption of said oil on the surface of said particulate material.

19. The method of claim 18 wherein the particulate material is a mineral aggregate selected from the group consisting of vermiculite, perlite, pumicite, sand, gravel, and silica.

20. The method of claim 18 wherein the metallic sulfate is ferrous sulfate.

21. The method of claim 18 wherein the alkali metal nitrate is sodium nitrate.

22. A method for removing oil from the surface of water comprising the steps of:
   a. providing a particulate material having an oleophilic, hydrophobic carbonized coating comprising a mixture of sulfur, a metallic sulfate, an alkali metal nitrate, and burned hydrocarbon oil;
   b. applying said coated particulate material to the oil on said water surface to cause adsorption of said oil on the surface of said particulate material; and
   c. removing said particulate material, with the oil adsorbed thereon, from the surface of said water.

23. A method for removing oil from the surface of water comprising the steps of:
   a. providing a particulate material having a specific gravity less than 1 and having an oleophilic, hydrophobic carbonized coating comprising a mixture of sulfur, ferrous sulfate, sodium nitrate, and burned hydrocarbon oil;
   b. applying said particulate material to the oil on said water surface to cause adsorption of said oil on the surface of said particulate material; and
   c. removing said particulate material, with the oil adsorbed thereon, from the surface of said water.

24. The method of claim 23 wherein said particulate material is expanded vermiculite.

25. The method of claim 23 wherein said particulate material is expanded perlite.

26. The method of claim 23 wherein said particulate material is pumicite.

27. The method of claim 23 wherein said particulate material is applied to said oil in a weight ratio of about 0.75 to 1.25 parts of particulate material for each part of oil.

28. The method of claim 27 wherein said ratio is about 1 to 1.

29. A method for removing oil from the surface of water comprising the steps of:
   a. providing a quantity of a particulate material having a specific gravity greater than 1 and having an oleophilic, hydrophobic carbonized coating comprising a mixture of sulfur, ferrous sulfate, sodium nitrate, and burned hydrocarbon oil;
   b. applying said coated particulate material to the oil on said water surface to cause adsorption of said oil on the surface of said coated particulate material; and
   c. allowing said particulate material, with the oil adsorbed thereon, to settle to the bottom of said water.

30. The method of claim 29 wherein said particulate material is sand.

31. The method of claim 29 wherein said particulate material is gravel.

32. The method of claim 29 wherein said particulate material is applied to said oil in a weight ratio of about one part of particulate material for each part of oil.

33. A method for removing oil from the surface of water comprising the steps of:
   a. providing a particulate material having a specific gravity less than 1 and having an oleophilic, hydrophobic carbonized coating comprising a mixture of sulfur, ferrous sulfate, and sodium nitrate, and burned hydrocarbon oil;
   b. applying said particulate material to the oil on said water surface to cause adsorption of said oil on the surface of said particulate material;
   c. removing said particulate material, with the oil adsorbed thereon, from the surface of said water; and
   d. stripping said adsorbed oil from said particulate material, thereby rendering said particulate material available for further use in removing oil from the surface of water.

34. The method of claim 34 wherein said stripping is achieved by solvent extraction.

35. The method of claim 34 wherein said stripping is achieved by a combination of solvent extraction and detergent washing.

* * * * *

UNITED STATES PATENT AND TRADEMARK OFFICE
CERTIFICATE OF CORRECTION

PATENT NO. : 5,035,804
DATED : July 30, 1991
INVENTOR(S) : Gene B. Stowe It is certified that error appears in the above-identified patent and that said Letters Patent is hereby corrected as shown below:

Column 12, line 30 should read:

---The method of claim 33 wherein said stripping is---

Signed and Sealed this

Fifteenth Day of December, 1992

Attest:

DOUGLAS B. COMER

Attesting Officer

Acting Commissioner of Patents and Trademarks